United States Patent [19]
Melvold

[11] 3,883,989
[45] May 20, 1975

[54] EXPANDABLE SHAPE-RETAINING PEAT MOSS BRIQUETTES AND METHOD OF PRODUCING SAME

[75] Inventor: Odd S. Melvold, Oslo, Norway

[73] Assignee: Jiffy Products International Ltd., Zug, Switzerland

[22] Filed: Oct. 29, 1973

[21] Appl. No.: 410,799

Related U.S. Application Data
[63] Continuation-in-part of Ser. No. 222,945, Feb. 2, 1972, abandoned.

[52] U.S. Cl. .................. 47/37; 44/32; 47/34.13
[51] Int. Cl. ................................... A01g 9/10
[58] Field of Search ...... 47/1, 58, 34, 37, 56, 34.13, 47/48.5; 44/23, 27, 32; 71/64 R, 64 A, 24

[56] References Cited
UNITED STATES PATENTS

| | | | |
|---|---|---|---|
| 535,934 | 3/1895 | Altham | 44/32 |
| 1,988,307 | 1/1935 | Fay | 47/1 |
| 2,143,468 | 1/1939 | Avery | 47/1 X |
| 2,848,842 | 8/1958 | Tennant | 47/34 |
| 2,952,462 | 9/1960 | Planin | 47/48.5 X |
| 3,375,607 | 4/1968 | Melvold | 47/37 |
| 3,467,609 | 9/1969 | Adams et al. | 47/37 X |
| 3,502,458 | 3/1970 | Schenk | 71/64 |
| 3,543,438 | 12/1970 | Edwards | 47/34.13 |
| 3,656,930 | 4/1972 | Martin | 71/24 |

*Primary Examiner*—Robert E. Bagwill
*Attorney, Agent, or Firm*—Ladas, Parry, VonGehr, Goldsmith & Deschamps

[57] ABSTRACT

Plants are grown in expanded peat moss units which have been produced by intermixing an aqueous bituminous emulsion with peat moss in critical proportions of peat moss to bitumen, drying the mixture, and compressing portions thereof uni-directionally to form rigid bodies. The compressed bodies have a thickness which is a small fraction of their original thickness. These bodies are expanded by contact with water to form soft cakes, which retain their shape without the need for external constraint, while permitting normal plant and root growth therein. The expanded shape-retaining cakes have a thickness intermediate their original and compressed thicknesses.

16 Claims, 5 Drawing Figures

PATENTED MAY 20 1975  3,883,989

3,883,989

EXPANDABLE SHAPE-RETAINING PEAT MOSS BRIQUETTES AND METHOD OF PRODUCING SAME

This application is a continuation-in-part of my co-pending application Ser. No. 222,945, filed Feb. 2, 1972, and now abandoned.

BACKGROUND OF THE INVENTION

The invention relates to the production of compressed, expandable shape-retaining peat moss briquettes suitable for growing plants. The prior art, as exemplified by my U.S. Pat. No. 3,375,607, utilized external means, such nets, sleeves, or pouches, to hold the peat moss cakes upon expansion. Such external constraining means makes plant-growing peat moss bodies more difficult and costly to produce, particularly where a variety of product shapes are desired, including multiple unit bodies.

As indicated in said U.S. Pat. No. 3,375,607 (col. 7, lines 55 to col. 8, line 14), I have previously suggested some possible ways of eliminating the external shape-confining means, such as mixing the peat moss with a synthetic resin, glue, or binder, in such a way as to provide a cellular or sponge-like retaining structure in which the particles of peat moss are within the cells of a sponge, with the interstitial spaces of a lattice structure. While such composite structures can be produced, they have been found to be unsatisfactory for the intended use, where the composite is compressed to a fraction of its volume, and later expanded by the addition of water, and then used for the starting and growing of plants.

It is therefore the object of the present invention to provide an expandable, shape-retaining peat moss body without the use of external sleeves or the like, which does not interfere with the plant-growing properties of the peat moss thereof. Another object is to provide a method for producing single and multiple plant growing units with the properties outlined above. Other objects and purposes of the present invention will become apparent upon reading the following specification and claims.

SUMMARY OF THE INVENTION

In accordance with the present invention an aqueous bituminous emulsion is admixed with peat moss, the admixture is partially dried, bodies are formed of the admixture and the bodies are compressed to form rigid bodies, such as wafers or plates. In the emulsion form the bitumen is dispersed in small particles surrounded by a continuous water phase. As the emulsion is mixed with the absorbent peat moss, the emulsion breaks, leaving the bitumen dispersed among the peat moss particles. When the compression occurs, the bitumen serves as a binder in the peat moss without coating or sealing the peat moss particles or forming a cellular structure. The peat moss remains absorbent, and upon contact with water it expands to soft, moist, shape-retaining cakes, which provide a suitable plant-growing medium that does not interfere with root growth.

THE DRAWINGS

DETAILED DESCRIPTION

Figure 1:
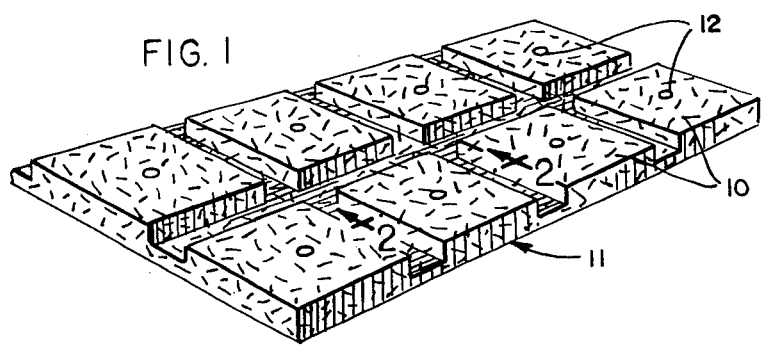
FIG. 1 is a fragmentary perspective view of a compressed plate providing a series of integral briquettes with seed cavities therein.

In producing the expandable shape-retaining peat moss bodies of the present invention, an aqueous bituminous emulsion is applied to finely-divided peat moss particles, while intermixing the peat moss particles to distribute the emulsion therethrough. Other natural fibrous cellulosic materials similar to peat moss may also be used with good results; for example Spanish Moss is a suitable material. The emulsion is of the oil-in-water type, having a continuous aqueous phase and a dispersed bituminous phase. During the intermixing the emulsion breaks, leaving the bitumen dispersed throughout the mix. The resulting admixture can contain from 15 to 40 percent by weight bitumen based upon the dry weight of the peat moss. In certain embodiments, the admixture preferably contains at least 20 percent (viz. 20 to 40 percent) by weight bitumen to dry weight of the peat moss.

While reference is made to the per cent bitumen to the peat moss on a dry weight basis, peat moss as an article of commerce for horticultural use always contains a substantial amount of moisture. Typical moisture contents of standard commercial peat moss are from 25 to 50 percent by weight. In practicing the present invention, the bituminous emulsion is applied to ground moist particles of peat moss. Preferably, at the time of intermixing with the emulsion, the peat moss will contain from 30 to 45 percent water based on the weight of the wet peat moss. In general, it will not be desirable to combine the emulsion with peat moss containing less than 25 percent water by weight, while the presence of excess water, such as water content of over 50 percent by weight, may interfere with the mixing, and will increase the cost of the process due to the necessity of removing more water prior to compressing the mix to form the briquettes.

Standard commercial aqueous bituminous emulsions can be employed for the purpose of the present invention. Typically, such emulsions contain from 50 to 70 percent by weight of asphalt or comparable bitumen. Of course, depending on the basic peat substrate and/or production variables, non-standard aqueous bituminous emulsions may be utilized, if desired. The oil-in-water emulsion of the bitumen can be formed and stabilized by any of the known kinds of bituminous emulsifying agents, including anionic emulsifiers, cationic emulsifiers, nonionic emulsifiers, or combinations thereof. Such emulsifiers are used in the required amounts to produce a stable emulsion at the bitumen concentration desired. In general, the emulsifier will comprise about 0.1 to 5 percent by weight of the emulsion. Typical specific emulsifiers of each type are:

1. anionic-long chain fatty or rosin acid soaps
2. cationic-long chain fatty acid diamines 3. non-ionic-alkyl phenol ethylene oxide condensates containing from 5 to 40 ethylene oxide groups per mole.

The emulsifiers may also advantageously contain a wetting agent which is non-toxic to plant and animal life, such as the alkyl phenol ethylene oxide condensates, containing from 5 to 10 ethylene oxide groups per mole. For example, based on the dry weight of the peat, it may be desirable to utilize from 0.1 to 5 percent by weight of such wetting agents. While the presence of a wetting agent is not essential, it is advantageous in increasing the rate at which the compressed bodies take-up water for expansion into the plant growing cakes.

In another embodiment of the present invention, the bitumen emulsion is heated to a temperature of from 25° to 35°C. before spraying. When so heated, lesser quantities of emulsion are generally required to produce the briquettes of this invention. The resulting admixture employing such a heated emulsion could contain from 10 to 30 percent by weight of bitumen based upon the dry weight of the peat moss.

After the mixing has been completed, the resulting admixture will contain not only the original water associated with the peat moss but also the water contained in the emulsion. It is therefore essential to appreciably reduce the water content of the mix prior to its compression into briquettes. In general, the moisture can be removed by low temperature evaporation, such as in a suitable dryer, until the moisture content of the total mix is reduced below 25 percent by weight. Because of the cost involved in removing the water, the possibility of overheating the peat moss and damaging its horticultural properties, and the desirability of having some moisture retained in the peat moss particles of the compressed briquettes, it is desirable to maintain above 5 percent, such as at least a 10 percent moisture content, in the mix at the time it is subjected to compression. Typical advantageous moisture contents for compression, range from about 15 to 20 percent by weight.

It is well known that the heating of peat moss to temperatures much above 40°C. for any extended period of time may modify the properties of the peat moss and make it less desirable for use in growing plants. Consequently, as previously indicated, the drying should preferably be conducted while maintaining the horticultural value of the peat moss. Usually, if the peat moss is kept at a temperature of not substantially over 40°C., the drying can be satisfactorily carried out. It will be understood, of course, that drying air used for moisture removal from the peat moss can be at a higher temperature than 40°C., since the evaporation of water will tend to reduce the temperature of the peat moss, making it possible to maintain the peat moss solids at a temperature at which their horticultural properties are not substantially affected.

In one preferred embodiment the drying is accomplished by employing controlled heated air of a maximum temperature of 60°C., while not allowing the temperature of the peat moss to exceed 40°C. While these drying conditions fulfill the necessary prerequisites of this invention, it is not limited to these listed parameters.

Next, portions of the admixture are formed into bodies of a shape, which on uni-directional compression and partial reexpansion, provide single or multiple unit cake for growing plants therein. Such shapes may be square, rectangular, round, or other shapes. In the illustrations of FIGS. 1 to 4, the compressed bodies are generally square in cross-section, and are formed into a plate as an integrated series. The individual plant bodies are designated as 10 and the multi-unit plate as 11.

Separate portions of the dried, bitumen-peat moss mix are compressed between dies to reduce height (i.e. thickness in the direction of compression) to at least one-half their uncompressed height while integrating the mix into rigid bodies. The compression molding step can be carried out in a manner similar to that described in my above-cited U.S. Pat. No. 3,375,607. Typically, the compressed volume will range from one-eighth to one-twelfth of the original volume, the compression, for example, being in a vertical direction, while the horizontal dimensions or width of the briquettes are maintained. In certain preferred embodiments, the compressed height or thickness of the bodies will range from about one-ninth to one-tenth of the original height, and thereby the compressed volume will be about one-ninth to one-tenth of the original volume. The compression will be limited, of course, by the free volume remaining for the water. In general, given sufficient pressure, the compression can proceed up to the point where water is squeezed out of the dies. The drying before compression should therefore be sufficient to permit compression of the mix to rigid bodies without squeezing out water.

Following the process just described, the briquettes can be formed individually in various cross-sectional shapes, or integrated into a series. Because of the compression ratios involved, the briquettes in their compressed form will usually appear as thin wafers, and, if integrated into a series, as relatively thin plates. This may be better appreciated by reference to FIG. 1 where the individual plant wafers are designated by the number 10 and the integrated multi-unit plate body by the number 11.

If desired, although not essential, seed planting holes or recesses can be formed in the bodies during the compression molding operation. For example, the upper mold can provide a small pin or piston that extends into the upper surface of the briquette, and forms a recess therein as indicated at 12 in FIGS. 1 and 2. More specifically, when the compression is achieved by means of a compression die, as preferred, the die can have a pin attached thereto. Upon compression, a cavity is formed in the rigid plate by the pin, the cavity, such as the cavities or recesses 12, will correspond in size to the size of the piston or pin. Further, as already indicated, the recess or cavity will retain its transverse dimensions upon expansion of the rigid plate, as illustrated in the drawings.

Figure 2:
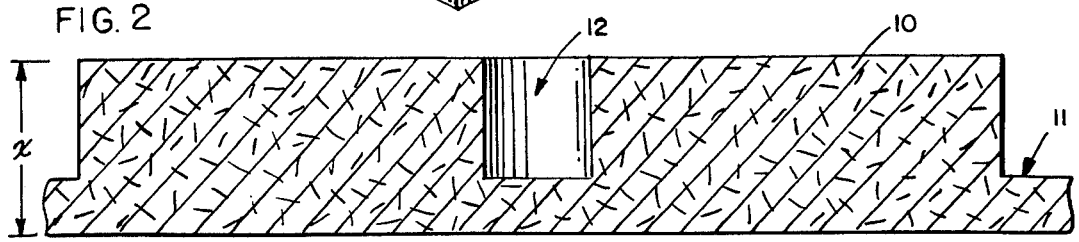
FIG. 2 is a fragmentary vertical sectional view of one of the briquettes of FIG. 1, taken on line 2—2 thereof.
Figure 4:
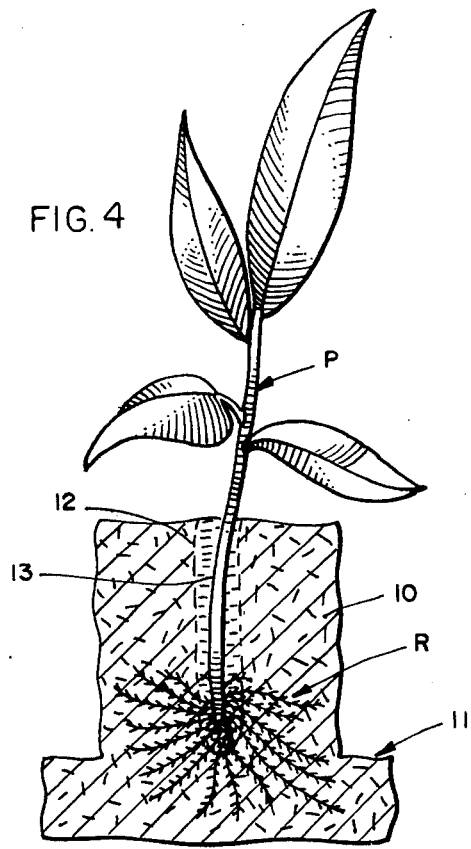
FIG. 4 is a fragmentary vertical sectional view of the same briquette with a plant growing therein.

After the wafer-type bodies have been formed, they can be stored for an indefinite period prior to use. When it is desired to employ them for starting seeds or growing cuttings, the bodies are first soaked in water. Within a relatively short time (5 to 15 minutes) the bodies expand upwardly and reach a thickness intermediate the compressed and uncompressed thicknesses, such as, for example, about 60 percent of their original height before compression. With reference to the drawings, the wafer section 10 of FIG. 2 is shown in its expanded reconstituted condition in FIG. 3. The height indicated by y in FIG. 3 corresponds to approximately 60 percent of the original height of the mix prior to compression. In relation to the height $x$ of the compressed body of FIG. 2, $y$ will usually be about 5 to 6 times $x$. As indicated previously, however, where a vertical compression only is utilized, only vertical expansion will occur, and therefore the lateral dimensions of the individual bodies 10, as well as the integrated plate 11 will remain substantially the same.

The upward expansion of the bodies 10 also result in an upward expansion or elongation of the planting holes 12. This is illustrated by comparing FIG. 3 wiht FIG. 2. The mix of the peat moss particles and the bitumen particles is sufficiently shape-retaining that even the sides of the hole 12 can be maintained during the upward expansion, thereby resulting in a relatively open and vertical sided planting hole for the bodies in their expanded condition. The expanded bodies form soft, moist cakes into which seeds and plants can be readily planted, even without pre-formed planting holes.

Figure 3:
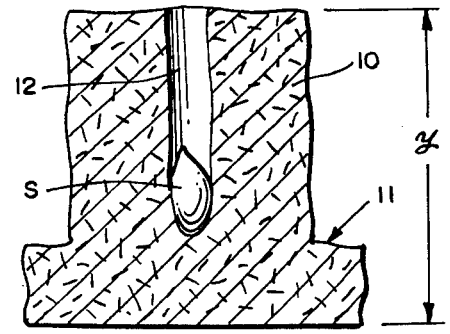
FIG. 3 is a fragmentary vertical sectional view showing one of the briquettes in expanded condition with a seed implanted in the seed cavity.

After expansion, a seed, such as the seed S shown in FIG. 3, can be inserted in the planting holes 12, or a hole may be punched or cut. Where needed, loose peat moss or other planting medium can be filled in above the seeds, such as in holes 12. Such a planting medium fill is indicated by the number 13 in FIG. 4. As shown in this figure, the seed is germinated, and resulted in a small plant P, which has its roots R growing outwardly into the peat moss-bitumen mix. Although the body remains integrated and substantially maintains its shape over repeated waterings during the growth of the plant, the growth of the roots of the plants are not interfered with.

It will be appreciated that many variations in the procedures described above are possible. For example, the growth holes can be formed with a pointed tool after the bodies have been expanded. For the planting of small seeds, only a small hole or depression need be formed.

In the expansion of the compressed briquettes by the addition of water, as indicated above, the absorption of water is accelerated where a suitable wetting agent has been incorporated in the peat moss-bitumen mix prior to compression.

This invention is further illustrated by the following specific example.

EXAMPLE

Young Sphagnum peat moss is processed and ground to form a finely-divided particulate mixture of peat moss particles. The desired final water content of the ground peat moss is 35 to 40 percent by weight based on the dry peat. Consequently, if the natural peat moss contains less than this amount of water, it is desirable to add water, or, if more than the desired average water content is present, a suitable amount of ground peat moss of lesser water content can be blended to result in the desired total average water content.

Because of the high absorption capacity of the ground peat, even at the specified moisture content level, the bituminous emulsion is sprayed on the peat through fine spray nozzles mounted in the center of a mixing drum. The inside of the drum is covered with Teflon (tetrafluoroethylene coating), which is of value in preventing build-up of bitumen on the inside of the mixing drum. The drum is rotated or provided with internal mixing paddles to turn the particles evenly and to thoroughly intermix the bituminous emulsion.

The bituminous emulsion is an oil-in-water emulsion containing 60 percent asphalt by weight, the asphalt having a penetration value in the range from 8 to 30, as determined by Method 1P49/67, British Institute of Petroleum, "IP Standards for Petroleum and its Products", Part 1. The emulsion contains 3 percent by weight of a soap emulsifier. The emulsion also contains 0.5 to 1.5 percent of a wetting agent; namely, Arkspal N.60, a nonyl phenol-ethylene oxide condensate containing 6 ethylene oxide groups per mole.

During the mixing, the emulsion breaks, and the asphalt is deposited in a dispersed condition throughout the peat moss. The resulting mix is then dried in a continuous band-type dryer using controlled heated air. In the feed end of the dryer, the layer of mix maintained at a thickness greater than 15 mm., and the drying air temperature is limited to 60°C. or below. As the moisture content of the mix is reduced, the drying air temperature can be reduced to prevent overheating of the peat fiber. At the discharge end of the dryer, the temperature of the mix is not over 40°C., thereby preventing the occurrence of irreversible chemical reactions which may be harmful to plants. The mix is discharged at a moisture content below 25 percent by weight, preferably in the range of 10 to 20 percent by weight.

Because of the large volume of the weight of peat and the nature of the fibers, it has been found desirable to use relatively slow compression. A slow-moving hydraulic press is suitable. Under full compression, the compressed bodies can be held without movement of the compressing dies for 0.5 to 1 seconds to permit the integration to be completed. The necessary pressure per inch is related to the moisture content of the peat mix. The drier the peat mix, the less pressure is required. For example, at a 12 percent moisture content, compression pressure of 3,000 psi can result in a 1/9 to 1/10 volume reduction, while at 25 percent moisture content, compression pressure up to 10,000 psi may be required to obtain the same degree of compression. Under both conditions, however, satisfactory compressed briquettes can be produced, which are readily expandable and retain their shape on expansion in the presence of water.

In order to avoid any sticking of the compressed bodies to the molds, a very thin layer of sieved peat particles (free of bitumen) can be sprayed into the bottom die, and on top of the mix after the die is filled, thereby also protecting the upper die. These added layers of peat particles tend to absorb any excess bitumen which is squeezed out of the top and bottom surfaces of the compressed bodies.

Figure 5:
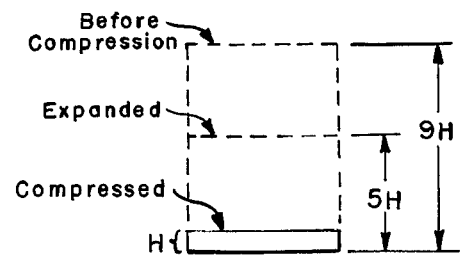
FIG. 5 is a diagrammatic view showing a typical thickness relation of the compressed rigid wafer to the uncompressed thickness of the bitumen-peat moss mix, and to the intermediate thickness of the expanded shape-retaining cakes.

With reference to the foregoing specific example, FIG. 5 illustrates the compression and expansion relationship of the bitumen-peat moss mix, the compressed wafer, and the expanded cake. For example, the loose mix is filled into the compressing die before compression will have a height or thickness of 9H. On compression of the mix to a rigid body, such as circular, plate-like wafer, the height or thickness will be equal to H. When the wafer is contacted with water, it will expand to form a soft, moist, shape-retaining cake having a height or thickness of 5H.

Seed starting and plant-growing bodies prepared as described above have been found to have a number of advantages. Under excess humidity conditions, such as mist propagation, the expanded bodies retain their shape. Further, they provide better drainage properties, filling up with water more slowly and retaining more air-flow pore spaces, which is beneficial to plant growth. Also, decomposition of the peat moss is inhibited. Another interesting advantage is that nutrients and fertilizer ingredients can more advantageously be incorporated in the briquettes. Where the fertilizer ingredients, such as nitrogen, phosphorous, and potassium sources, are mixed with the peat moss prior to addition of the emulsion, more of the fertilizer ingredients can be incorporated without causing any burning or adverse effect on the plants.

What is claimed is:

1. The method of producing expandable, shape-retaining peat moss briquettes for use in growing plants, comprising:
   a. applying an aqueous bituminous emulsion to finely-divided moisture-containing peat moss particles while intermixing said peat moss particles to distribute said emulsion therethrough, said peat moss containing from 25 to 50 percent water by weight, said emulsion having a continuous aqueous phase and a dispersed bituminous phase, said emulsion breaking upon said intermixing to deposit dispersed particles of bitumen, the resulting admixture containing from 15 to 40 percent by weight of bitumen based upon the dry weight of said peat moss;
   b. drying said peat moss-bitumen mix to a water content of below 25 percent by weight at which said mix is compressible without squeezing out water, the temperature of said mix during drying being controlled to prevent damage to the horticultural properties of the peat moss; and
   c. compressing individual portions of said dried mix in one direction, said compressing integrating said mix portions by reducing their thickness to less than one-half their uncompressed thickness in the direction of said compression and being sufficient to form said portions into rigid bodies;
   d. whereby said rigid bodies are expandable on contact with water, said expansion being in the direction of said compression to a thickness intermediate their compressed and uncompressed thickness to form soft, moist, shape-retaining cakes.

2. The method of claim 1 in which said rigid bodies have a thickness of not over one-eighth the uncompressed thickness of said mix portions.

3. The method of claim 1 in which said mix contains at least 20 percent of said bitumen based on the dry weight of said peat moss.

4. The method of claim 1 in which said dried mix still contains at least 10 percent water by weight.

5. The compressed rigid bodies produced by the method of claim 1.

6. The method of producing expandable, shape-retaining peat moss briquettes for use in growing plants, comprising:
   a. applying an aqueous bituminous emulsion to finely-divided moisture-containing peat moss particles while intermixing said peat moss particles to distribute said emulsion therethrough, said peat moss containing from 25 to 50 percent water by weight, said emulsion having a continuous aqueous phase and a dispersed bituminous phase, said emulsion breaking upon said intermixing to deposit dispersed particles of bitumen, the resulting admixture containing from 20 to 40 percent by weight of bitumen based upon the dry weight of said peat moss;
   b. drying said peat moss-bitumen mix to a water content of below 25 percent by weight at which said mix is compressible without squeezing out water, the temperature of said mix during drying being controlled to prevent damage to the horticultural properties of the peat moss and said drying being discontinued before said mix contains less than 10 percent water by weight; and
   c. compressing individual portions of said dried mix in one direction, said compressing integrating said mix portions by reducing their thickness to less than one-eighth their uncompressed thickness in the direction of said compression and being sufficient to form said portions into rigid bodies;
   d. whereby said rigid bodies are expandable by contact with water, said expansion being in the direction of said compression to a thickness intermediate their compressed and uncompressed thicknesses to form soft, moist, shape-retaining cakes.

7. The compressed rigid bodies produced by the method of claim 6.

8. A method of producing expandable, shape-retaining peat moss briquettes for use in growing plants comprising:
   a. applying an aqueous bituminous emulsion to finely-divided moisture-containing peat moss particles while intermixing said peat moss particles to distribute said emulsion therethrough, said peat moss containing from 25 to 50 percent water by weight, said emulsion having a continuous aqueous phase and a dispersed bituminous phase, said emulsion breaking upon said intermixing to deposit dispersed particles of bitumen, the resulting admixture containing from 15 to 40 percent by weight of bitumen based upon the dry weight of said peat moss;
   b. drying said peat moss-bitumen mix to a water content of below 25 percent by weight at which said mix is compressible without squeezing out water, the temperature of said mix during drying being controlled to prevent damage to the horticultural properties of the peat moss; and
   c. compressing individual portions of said dried mix in one direction, said compressing integrating said mix portions by reducing their thickness to less than one-half their uncompressed thickness in the direction of said compression and being sufficient to form said portions into rigid bodies of the general shape of plant-growing briquettes, said rigid briquettes being expandable by contacting them with water to form soft, moist, shape-retaining cakes for growing plants therein.

9. The compressed rigid bodies produced by the method of claim 8.

10. A method of producing expandable shape-retaining peat moss briquettes for use in growing plants comprising:
   a. spraying an aqueous bituminous emulsion onto finely-divided moisture-containing peat moss particles while intermixing said peat moss particles to distribute said emulsion therethrough, said peat moss containing from 25 to 50 percent by weight, said emulsion having a continuous aqueous phase and a dispersed bituminous phase, said emulsion breaking upon said intermixing to deposit dispersed particles of bitumen, the resulting admixture containing from 20 to 40 percent by weight of bitumen based upon the dry weight of said peat moss;

b. drying said peat moss-bitumen mix to a water content of below 25 percent by weight at which said mix is compressible without squeezing out water, the temperature of said mix during drying being controlled to prevent damage to the horticultural properties of the peat moss and said drying being discontinued before said mix contains less than 10 percent water by weight; and c. compressing individual portions of said dried mix in one direction, said compressing integrating said mix portions by reducing their thickness to less than one-eighth their uncompressed thickness in the direction of said compression and being sufficient to form said portions into rigid briquettes, said rigid briquettes being expandable by contacting them with water to form soft, moist, shape-retaining cakes for growing plants therein.

11. The compressed rigid briquettes produced by the method of claim 10.

12. The method of claim 10, wherein said aqueous bituminous emulsion is heated prior to spraying onto said finely-divided peat moss particles.

13. An expandable, shape-retaining compressed peat moss briquette which consists essentially of a peat moss bitumen mix with a water content of from 10 to 25 percent by weight and from 15 to 40 percent bitumen by weight, said bitumen having been contacted with said peat moss by intermixing into said peat moss an aqueous bitumen emulsion having a continuous aqueous phase and a dispersed bituminous phase, and the admixture has been formed into a body having the general shape of the briquette and then compressed to reduce the height of the body to at least one-half the uncompressed height thereof while integrating the body into a shape-retaining briquette.

14. A plurality of expandable, shape-retaining compressed peat moss briquettes as defined in claim 13, which are integrated into a series forming a multi-unit body.

15. The use of an expandable, shape-retaining compressed peat moss briquette as defined in claim 13, in the growing of plants.

16. The use of a plurality of expandable, shape-retaining compressed peat moss briquettes as defined in claim 14, in the growing of plants.

* * * * *